United States Patent
Noguchi et al.

(10) Patent No.: US 7,994,751 B2
(45) Date of Patent: Aug. 9, 2011

(54) FUEL CELL POWER SUPPLY DEVICE

(75) Inventors: Minoru Noguchi, Wako (JP); Mitsuaki Hirakawa, Wako (JP); Takeshi Fujino, Wako (JP); Eisuke Komazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 559 days.

(21) Appl. No.: 12/222,292

(22) Filed: Aug. 6, 2008

(65) Prior Publication Data

US 2009/0039839 A1    Feb. 12, 2009

(30) Foreign Application Priority Data

Aug. 8, 2007    (JP) ................. 2007-206905

(51) Int. Cl.
*H01M 10/44* (2006.01)
*G05F 1/10* (2006.01)
*B60K 1/00* (2006.01)
*G08B 3/00* (2006.01)

(52) U.S. Cl. ........ 320/101; 320/104; 320/136; 323/234; 340/636.1; 340/636.21; 318/441; 429/400; 180/65.21

(58) Field of Classification Search ............ 320/101
See application file for complete search history.

(56) References Cited

U.S. PATENT DOCUMENTS 5,905,362 A * 5/1999 Nagano et al. ............... 320/125
6,744,237 B2 * 6/2004 Kopf et al. .................. 320/104
2004/0217732 A1 * 11/2004 Zhu et al. ..................... 320/101
2009/0266397 A1 * 10/2009 Gibson et al. ................ 136/244

FOREIGN PATENT DOCUMENTS

JP    2006-006033    1/2006
JP    2006-020455    1/2006

* cited by examiner

*Primary Examiner* — Edward Tso
*Assistant Examiner* — Yalkew Fantu
(74) *Attorney, Agent, or Firm* — Squire, Sanders & Dempsey (US) LLP (57) ABSTRACT

A fuel cell power supply device capable of externally supplying electric power in a stable manner is provided. The fuel cell power supply device includes a fuel cell (1), a capacitor (2) connected in parallel to the fuel cell, a voltage boosting means (3) having an input unit connected in parallel to the fuel cell and the capacitor and an output unit connected to a load (M), and for boosting the output voltages of the fuel cell and the capacitor to supply electric power by the boosted voltages to the load, a secondary battery (6) connected to the output unit of the voltage boosting means via a voltage conversion means (7), a first electric power supply unit (10) connected in parallel to the fuel cell and the capacitor and capable of externally supplying electric power, and an electric power supply control means (30) for controlling supply of electric power from the fuel cell, the capacitor, and the secondary battery to the first electric power supply unit, based on the output of the fuel cell and the charge levels of the capacitor and the secondary battery, in a range where the charge level of the capacitor is not lower than its discharge threshold value and the charge level of the secondary battery is not lower than its discharge threshold value.

11 Claims, 4 Drawing Sheets

FUEL CELL POWER SUPPLY DEVICE

BACKGROUND OF THE INVENTION

1. Field of the Invention

The present invention relates to a fuel cell power supply device capable of externally outputting electric power from a fuel cell, a capacitor, and a secondary battery.

2. Description of the Related Art

There is conventionally known a power supply system having a battery as a power source, wherein the battery voltage is boosted and fed to a power supply line, and the voltage supplied to the power supply line is converted by a DC/AC converter to commercial AC voltage for output (see Japanese Patent Application Laid-Open No. 2006-006033). There is also known a system wherein electric power generated by a motor from the motive power of the engine and electric power of a battery are converted to commercial AC power supply via an AC inverter (see Japanese Patent Application Laid-Open No. 2006-020455).

In the power supply system having the power source configured with the battery alone, the DC voltage supplied by boosting the battery voltage is converted to AC voltage to readily obtain the commercial AC power supply. This however does not allow use beyond the charge capacity of the battery. Similarly, even in the case where the electric power generated when the motor is rotated by the motive power of the engine is available, the engine power cannot be taken out unless the ignition is on, which again restricts the use up to the charge capacity of the battery.

SUMMARY OF THE INVENTION

In view of the foregoing, an object of the present invention is to provide a fuel cell power supply device capable of externally supplying electric power in a stable manner.

To achieve the above object, a fuel cell power supply device of the present invention includes: a fuel cell; a capacitor connected in parallel to the fuel cell; a voltage boosting means having an input unit connected in parallel to the fuel cell and the capacitor and having an output unit connected to a load, and for boosting output voltages of the fuel cell and the capacitor to supply electric power by the boosted voltages to the load; a first electric power supply unit connected in parallel to the fuel cell and the capacitor and capable of externally supplying electric power; and an electric power supply control means for controlling supply of electric power from the fuel cell and the capacitor to the first electric power supply unit, based on an output of the fuel cell and a charge level of the capacitor, in a range where the charge level of the capacitor is not lower than a discharge threshold value of the capacitor.

According to the fuel cell power supply device of the present invention, in the system where the voltages supplied from the capacitor and the fuel cell are boosted by the voltage boosting means to supply electric power to the load with high voltage, the first electric power supply unit connected in parallel to the fuel cell and the capacitor is configured to allow supply of the electric power from the capacitor and the fuel cell. Further, the configuration of the capacitor and the fuel cell connected in parallel enables the capacitor to be charged with the electric power supplied from the fuel cell to the capacitor.

Accordingly, it is possible to stably supply electric power from the fuel cell and the charged capacitor to the first electric power supply unit, on the condition that the charge level of the capacitor is in a range not lower than its discharge threshold value, to prevent degradation of the capacitor.

Preferably, the fuel cell power supply device of the present invention further includes a secondary battery connected to the output unit of the voltage boosting means via a voltage conversion means, wherein the electric power supply control means controls supply of electric power from the fuel cell, the capacitor, and the secondary battery to the first electric power supply unit, based on an output of the fuel cell, a charge level of the capacitor, and a charge level of the secondary battery, in a range where the charge level of the capacitor is not lower than a discharge threshold value of the capacitor and where the charge level of the secondary battery is not lower than a discharge threshold value of the secondary battery.

According to the fuel cell power supply device of this invention, in the system where the voltages supplied from the capacitor and the fuel cell are boosted by the voltage boosting means to supply electric power to the load with high voltage, the first electric power supply unit connected in parallel to the fuel cell and the capacitor is configured to allow supply of the electric power from the capacitor and the fuel cell, and allow supply of the electric power from the secondary battery as well.

Further, the configuration of the capacitor and the fuel cell connected in parallel enables charging of the capacitor with the electric power supplied from the fuel cell to the capacitor. By comparison, the secondary battery connected to the fuel cell via the voltage boosting means and the voltage conversion means can be charged with the electric power supplied from the fuel cell to the secondary battery via the voltage boosting means and the voltage conversion means.

Accordingly, it is possible to stably supply electric power from the fuel cell, the charged capacitor, and the charged secondary battery to the first electric power supply unit, on the condition that the charge levels of the capacitor and the secondary battery are both in a range not lower than the corresponding discharge threshold value, to prevent degradation of the capacitor and the secondary battery.

Further, in the fuel cell power supply device of the present invention, the electric power supply control means preferably controls such that the supply of the electric power to the first electric power supply unit is carried out from the capacitor or from the secondary battery prior to operation of the fuel cell.

According to this fuel cell power supply device, the electric power is supplied to the first electric power supply unit preferentially from the charged capacitor and secondary battery, to minimize operation of the fuel cell. This eliminates the need to change the output of the fuel cell in accordance with the electric power consumed by the first electric power supply unit, thereby ensuring stable supply of the electric power to the first electric power supply unit.

Further, while a certain activation time is required from the start of operation of the fuel cell to the time when it can output a predetermined rated output, according to this fuel cell power supply device, the electric power is supplied from the capacitor or the secondary battery to the first electric power supply unit prior to operation of the fuel cell, which allows the first electric power supply unit to be used without the need to wait for the fuel cell to be ready to output the electric power. Further, the operation of the fuel cell is started at the time when the charge level of the capacitor or the secondary battery decreases to a predetermined value taking into consideration the activation time of the fuel cell, which can prevent degradation of the capacitor or the secondary battery due to the charge level decreasing below its discharge threshold value.

Further, in the fuel cell power supply device of the present invention, it is preferable that the electric power supply control means carries out supply of the electric power to the first electric power supply unit firstly from the capacitor, secondly from the secondary battery, and thirdly from the fuel cell. In the case where the charge level of the capacitor reaches the discharge threshold value, the electric power supply control means starts supply of the electric power to the first electric power supply unit from the secondary battery in place of the capacitor, and in the case where the charge level of the secondary battery reaches a predetermined value that is set greater than the discharge threshold value, the electric power supply control means starts operation of the fuel cell, and when the fuel cell is ready to output a predetermined output, the electric power supply control means starts supply of the electric power to the first electric power supply unit from the fuel cell in place of the secondary battery.

According to this fuel cell power supply device, because the capacitor tends to be smaller in charge capacity than the secondary battery and have high charge and discharge rates, discharge may be started firstly from the capacitor, which is followed by discharge from the secondary battery before the charge level of the capacitor decreasing below its discharge threshold value. Since the secondary battery greater in charge capacity is secondly discharged, the reduction ratio of the charge level by the discharge is small, which ensures stable supply of the electric power to the first electric power supply unit over a long period of time. Further, the above-mentioned predetermined value may be set such that the fuel cell is able to output a predetermined output before the charge level of the secondary battery decreases below its discharge threshold value, which ensures stable supply of the electric power to the first electric power supply unit even during the activation time of the fuel cell, and also prevents the charge level of the secondary battery from decreasing below its discharge threshold value. Discharge from the fuel cell is started thirdly, after the fuel cell becomes ready to output a predetermined output, which ensures stable supply of the electric power from the fuel cell to the first electric power supply unit, and also enables charging of the capacitor and the secondary battery by the fuel cell.

Further, in the fuel cell power supply device of the present invention, the first electric power supply unit is preferably provided between the capacitor and the voltage boosting means.

According to the fuel cell power supply device of this invention, relatively low voltage before being boosted by the voltage boosting means can be supplied to the first electric power supply unit directly from the capacitor and the fuel cell. Further, since the voltage boosting means functions as a voltage step-down means (step-down converter) in the opposite direction, the voltage boosting means can be used as the voltage step-down means from the side of the load to thereby supply low voltage to the first electric power supply unit from the secondary battery as well.

Further, in the fuel cell power supply device of the present invention, it is preferable that the electric power supply control means controls operation of one or both of the voltage boosting means and the voltage conversion means to control supply of the electric power from the secondary battery to the first electric power supply unit and supply of the electric power from the fuel cell to the secondary battery.

According to this fuel cell power supply device, the secondary battery is connected to the first electric power supply unit via the voltage boosting means and the voltage conversion means. Thus, it is possible to control supply of the electric power from the secondary battery to the first electric power supply unit by controlling the operation of one or both of the voltage boosting means and the voltage conversion means. Further, since the secondary battery is connected to the fuel cell via the voltage boosting means and the voltage conversion means, it is possible to control supply of the electric power from the fuel cell to the secondary battery, i.e., charging of the secondary battery, by controlling the operation of one or both of the voltage boosting means and the voltage conversion means. As such, controlling the operation of one or both of the voltage boosting means and the voltage conversion means can readily implement the configuration where the electric power is supplied from the secondary battery to the first electric power supply unit and the configuration where the electric power is supplied from the fuel cell to the secondary battery.

Further, the fuel cell power supply device of the present invention may include a second electric power supply unit connected in parallel to the voltage conversion means and the secondary battery and capable of externally supplying electric power.

According to this fuel cell power supply device, the second electric power supply unit is provided on the output unit side of the voltage boosting means. As such, the second electric power supply unit may be used in place of the first electric power supply unit when the first electric power supply unit is in use, or the electric power may be supplied to the second electric power supply unit with the voltage different from that of the first electric power supply unit, for supplement of the first electric power supply unit.

Further, in the fuel cell power supply device of the present invention, the second electric power supply unit is preferably provided between the voltage conversion means and the secondary battery.

According to the fuel cell power supply device of this invention, the second electric power supply unit is connected to the secondary battery between the voltage conversion means and the secondary battery, and is supplied with the electric power preferentially from the secondary battery. This allows, e.g., relatively small electric power to be supplied from the secondary battery to the second electric power supply unit over a long period of time.

Further, the fuel cell power supply device of the present invention is preferably mounted on a vehicle, wherein the load is an electric motor serving as a motive power source of the vehicle.

According to the fuel cell power supply device of this invention, the fuel cell power supply device is mounted on a vehicle, and the electric motor serving as the motive power source of the vehicle is the load. This means that the electric power for driving the vehicle needs to be supplied to the electric motor with high voltage. In contrast, the electric power is supplied externally via the fuel cell power supply device often at a voltage lower than that required for the electric motor. According to the configuration of the fuel cell power supply device of the present invention, the high voltage and the low voltage can effectively be supplied to the electric motor and the first electric power supply unit, respectively.

Further, in the fuel cell power supply device of the present invention, the first electric power supply unit preferably includes a first switch turning on/off external supply of the electric power.

According to the fuel cell power supply device of this invention, the first switch may be switched according to whether it is necessary to supply electric power to the first electric power supply unit, to permit or prohibit supply of the electric power to the outside.

Further, the fuel cell power supply device of the present invention may include a display means for displaying the charge levels of the capacitor and the secondary battery.

According to the fuel cell power supply device of this invention, the user of the fuel cell power supply device can recognize the electric power amount that can be supplied from the first or second electric power supply unit, based on the charge levels of the capacitor and the secondary battery. Particularly in the case where the second electric power supply unit is provided in addition to the first electric power supply unit, it is possible to select one of the first and second electric power supply units to receive electric power therefrom.

DESCRIPTION OF THE PREFERRED EMBODIMENTS

An embodiment of the present invention will now be described with reference to FIGS. 1 to 4.

Figure 1:
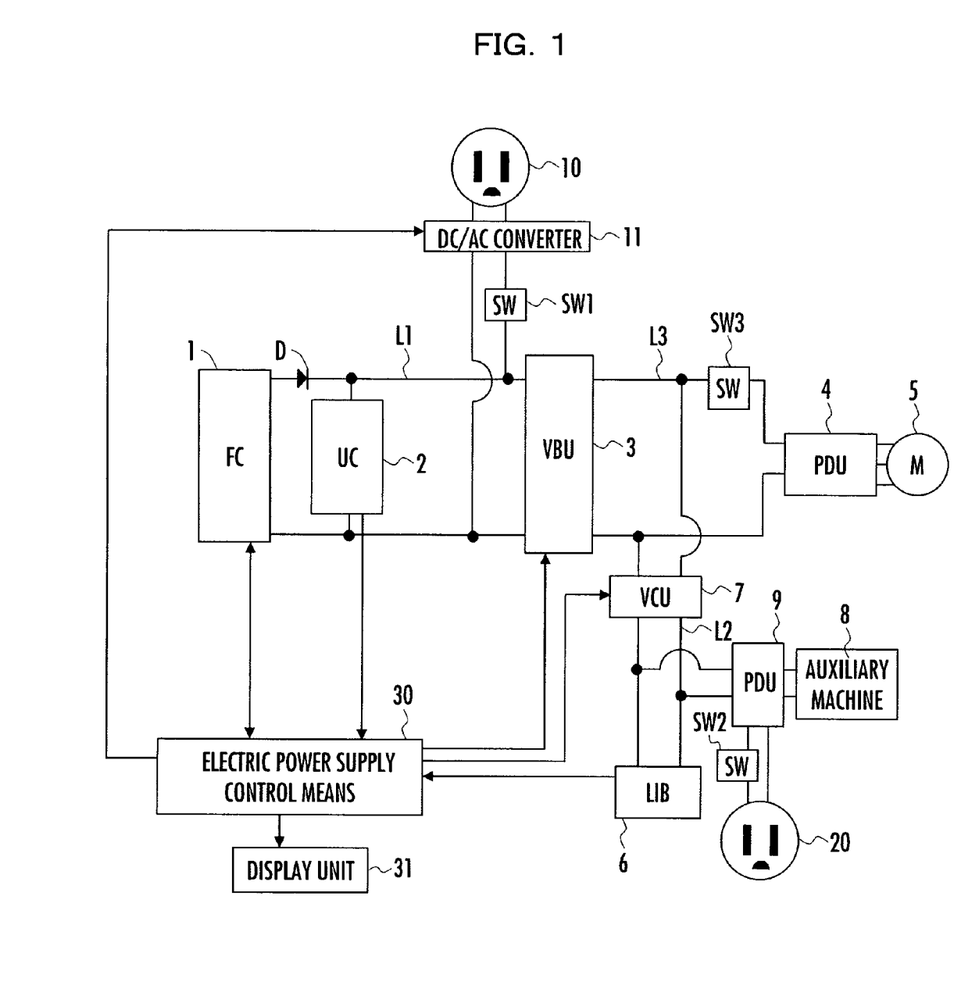
FIG. 1 shows the entire configuration of the fuel cell power supply device according to an embodiment of the present invention.

Referring to FIG. 1, the fuel cell power supply device of the present embodiment is mounted on a fuel cell vehicle (corresponding to the "vehicle" of the present invention), and includes: a fuel cell 1; an electrical double layer capacitor 2 (hereinafter, simply referred to as the "capacitor 2") connected in parallel to the fuel cell 1; a voltage boosting means 3 (Voltage Boost Unit) having an input unit connected to the fuel cell 1 and the capacitor 2 and an output unit connected to an electric motor 5 (corresponding to the "load" of the present invention) via a power drive unit (PDU) 4; and a voltage conversion means 7 (Voltage Conversion Unit) having an input unit connected to the voltage boosting means 3 and an output unit connected to a secondary battery 6 (which is a lithium ion battery in the present embodiment).

The fuel cell 1, which is composed, e.g., of 250 fuel cell stacks connected in series, has an output voltage varying in a range from about 225 V (output current: 0 A) to about 180 V (output current: 210 A). The capacitor 2, which is the electrical double layer capacitor, has an output voltage varying in a range around 200 V (with the lower limit of about 154 V and the upper limit of about 243 V). The secondary battery 6 has an output voltage varying in a range from about 290 V to about 350 V.

The voltage boosting means 3, which is for example a DC/DC converter with a power rating of 100 kw and a step-up ratio of 1.5 to 2.4, has at least a voltage step-up function, and optionally has a voltage step-down function. The voltage conversion means 7 is for example a DC/DC converter with a power rating of 10 kw and a step-up ratio of 1.36 to 1.70.

The fuel cell power supply device further includes a first electric power supply unit 10 (which is an outlet in the present embodiment) connected between the capacitor 2 and the voltage boosting means 3 and in parallel with the fuel cell 1 and the capacitor 2. The first electric power supply unit 10 is connected to a first electric power supply line L1 via a DC/AC converter 11 composed of an inverter circuit, with the first electric power supply line L1 directly connected to the fuel cell 1 and the capacitor 2. The DC/AC converter 11 converts the DC voltage on the first electric power supply line L1 to the commercial AC voltage for supply to the first electric power supply unit 10.

The fuel cell power supply device further includes an auxiliary machine 8 and a second electric power supply unit 20 (an outlet in the present embodiment) which are connected between, and in parallel with, the secondary battery 6 and the voltage conversion means 7. The auxiliary machine 8 is for example a pump for supplying a reaction gas such as a hydrogen gas to the fuel cell 1. The auxiliary machine 8 and the second electric power supply unit 20 are connected via a power drive unit (PDU) 9 to a second electric power supply line L2, which is directly connected to the secondary battery 6 and the voltage conversion means 7. The second electric power supply unit 20 is supplied with a low voltage (of DC 12 V, for example) regulated by the PDU 9 preferentially from the secondary battery 6, and accommodates connection of a television set, radio, lighting equipment or the like which is brought in the vehicle.

A first switch SW 1 is provided between the first electric power supply line L1 and the DC/AC converter 11, which turns ON/OFF the supply of the electric power to the first electric power supply unit 10. A second switch SW 2 is provided between the second electric power supply unit 20 and the PDU 9, which turns ON/OFF the supply of the electric power from the second electric power supply line L2 to the second electric power supply unit 20. Further, a third switch SW 3 is provided on a third electric power supply line L3 having the voltage level boosted from that on the first electric power supply line L1 by the voltage boosting means 3, to turn ON/OFF the supply of the electric power to the electric motor 5. The turning ON/OFF of the third switch SW 3 is controlled by an electric power supply control means 30, which will be described later, in response to turning ON/OFF of the first switch SW 1 and the second switch SW 2 by the user.

The fuel cell power supply device also includes the electric power supply control means 30. The electric power supply control means 30 obtains detection signals from voltage sensors and current sensors (not shown) provided in the fuel cell 1, the capacitor 2, and the secondary battery 6, to detect the voltage, current, and electric power output from each of the fuel cell 1, the capacitor 2, and the secondary battery 6.

The electric power supply control means 30 has a table defining the relationship between the output voltage and output current of the capacitor 2 and the SOC (State of Charge) representing the charge level of the capacitor 2, and also has a table defining the relationship between the output voltage and output current of the secondary battery 6 and the SOC representing the charge level of the secondary battery 6. The electric power supply control means 30 calculates the SOC of the capacitor 2 and that of the secondary battery 6 from the output voltage and output current of the capacitor 2 and those of the secondary battery 6, respectively.

Further, the electric power supply control means 30 carries out operation control of the fuel cell 1 as well as operation control of the voltage boosting means 3, the voltage conversion means 7, and the DC/AC converter 11, based on the output of the fuel cell 1, the SOC of the capacitor 2, and the SOC of the secondary battery 6, as will be described later, for supplying electric power from the fuel cell 1, the capacitor 2, and the secondary battery 6 to the first electric power supply unit 10, and for charging the capacitor 2 and the secondary battery 6 from the fuel cell 1.

The electric power supply control means 30 includes a display unit 31 composed of a liquid crystal display means, for example, which displays an output of the fuel cell 1 calculated by the electric power supply control means 30, the SOC of the capacitor 2, and the SOC of the secondary battery 6, and also displays which one of the fuel cell 1, the capacitor 2, and the secondary battery 6 is supplying electric power to the first electric power supply unit 10, and whether the fuel cell 1 is charging the capacitor 2 and the secondary battery 6, and the like.

The electric power supply control means 30 obtains and calculates those data pieces at regular intervals or at predetermined timings, and displays them on the display unit 31. The predetermined timings may include the time when the ignition is turned ON or OFF, the time when the first or second switch is turned ON or OFF, and the like. This allows the user to recognize the amount of electric power that can be supplied from the first or second electric power supply unit 10 or 20, based on the SOC of the capacitor 2 and that of the secondary battery 6, and thus, to determine which one to choose, the first electric power supply unit 10 or the second electric power supply unit 20, to receive supply of the electric power therefrom.

For example, in the case where the SOC of the capacitor 2 and that of the secondary battery 6 are both not less than a predetermined level (30%, for example), or in the case where the SOC of the secondary battery 6 is not less than a predetermined level, the user can recognize that it is appropriate to receive electric power from the first electric power supply unit 10. On the other hand, if the SOC of the secondary battery 6 is less than the predetermined level, the user can recognize that it is inappropriate to receive electric power from the first electric power supply unit 10 and appropriate to receive relatively low electric power from the second electric power supply unit 20. In this manner, the user is provided with the index which helps the user to select either the first electric power supply unit 10 or the second electric power supply unit 20 to receive electric power therefrom.

Further, in the fuel cell power supply device of the present embodiment, a diode D is provided between the fuel cell 1 on one side and the voltage boosting means 3 and the capacitor 2 on the other side, to prohibit flow of electric current to the fuel cell 1. The diode D may be replaced with a transistor or any other rectifier, or the capacitor 2 may be connected to the fuel cell 1 via a voltage step-down means (step-down converter), to prohibit the flow of the electric current into the fuel cell 1.

The entire configuration of the fuel cell power supply device of the present embodiment has been described above.

Hereinafter, an overall operation of the fuel cell power supply device of the present embodiment will be described with reference to FIGS. 2 to 4.

Figure 2:
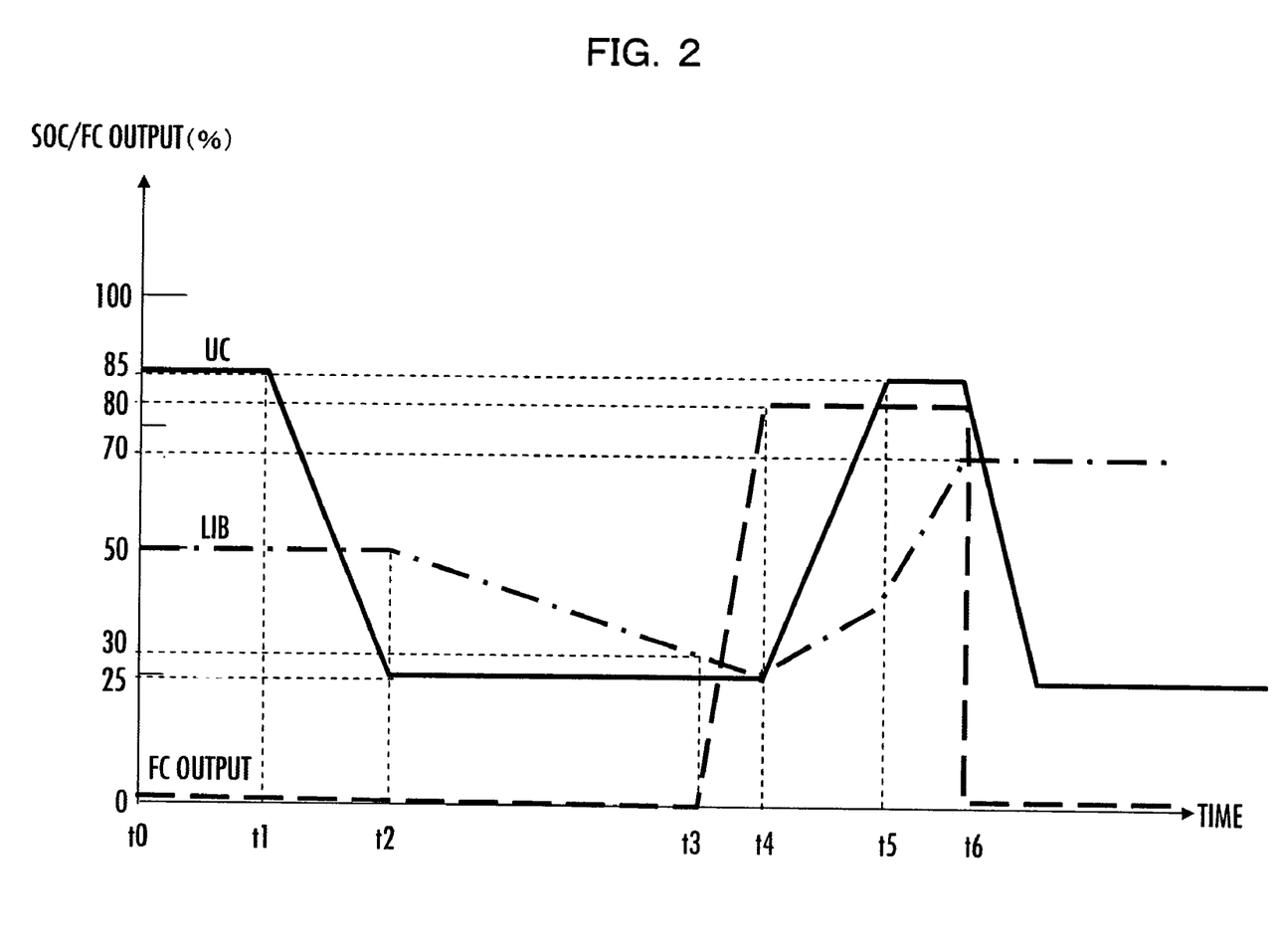
FIG. 2 illustrates how electric power is supplied by the fuel cell power supply device shown in FIG. 1.

FIG. 2 shows a change in electric power supply from the fuel cell 1, the capacitor 2, and the secondary battery 6 to the first electric power supply unit 10, with the horizontal axis representing time (t) and the vertical axis indicating the SOC of the capacitor 2, the SOC of the secondary battery 6, and the output of the fuel cell 1 (%).

In the present embodiment, it is assumed that the electric power is externally supplied via the first electric power supply unit 10, with the ignition of the fuel cell vehicle turned OFF, from the state where no electric power is generated from the fuel cell 1 at time t0. This corresponds, e.g., to the state where the fuel cell vehicle is in a campground or the like with the ignition turned OFF, and an external device (such as a personal computer or a hot plate) is connected to the first electric power supply unit 10 for supplying electric power thereto.

Figure 3:
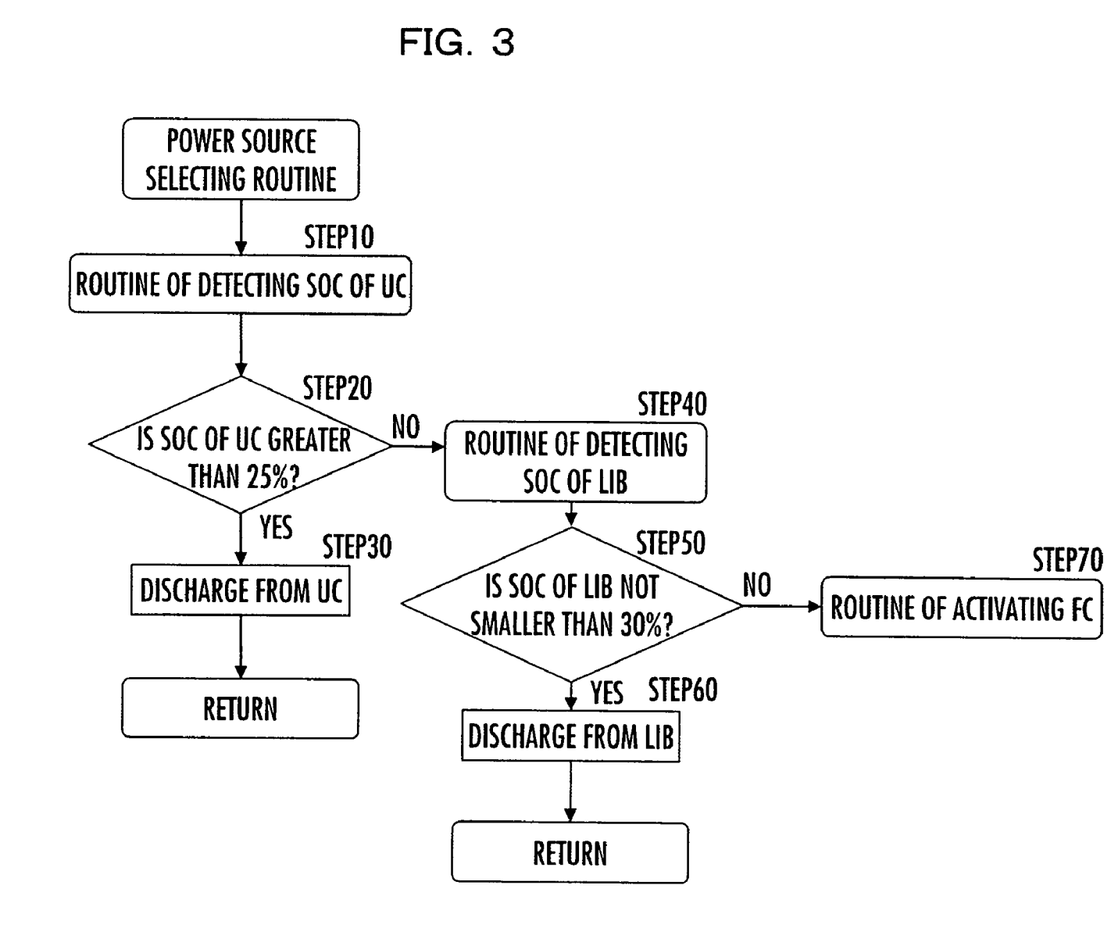
FIG. 3 is a flowchart illustrating electric power supplying processing.
Figure 4:
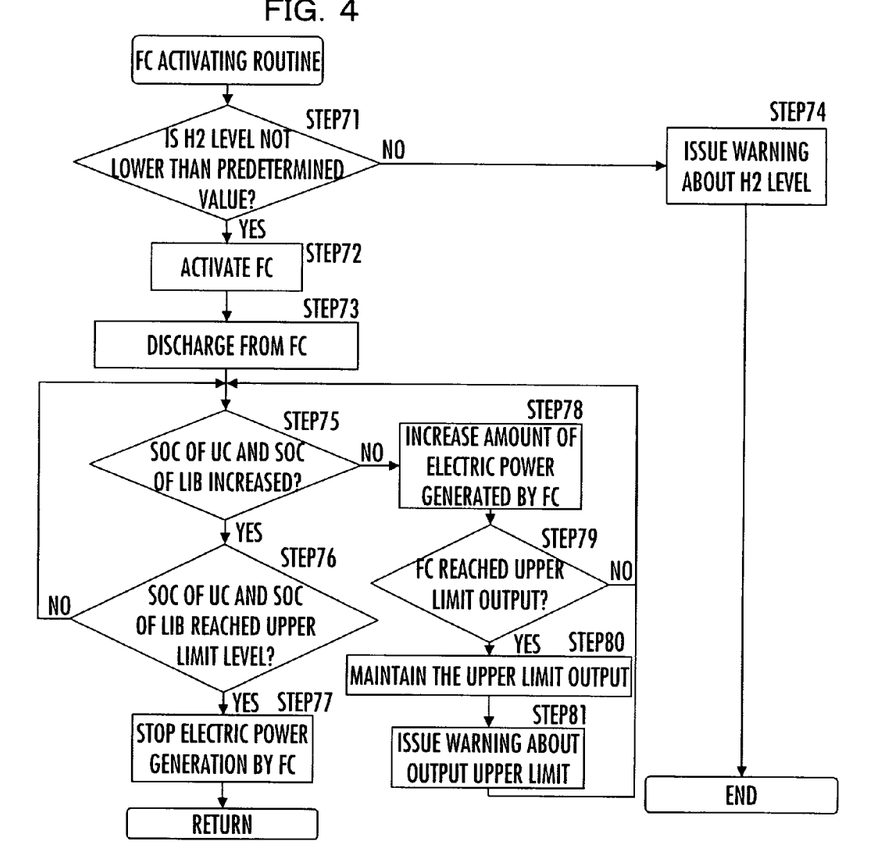
FIG. 4 is a flowchart illustrating the routine of activating the fuel cell in FIG. 3.

Firstly, when the user turns ON the first switch SW 1 and connects the external device to the first electric power supply unit 10 at time t1, the electric power supply control means 30 follows the power source selecting routine shown in FIG. 3 to determine which one of the fuel cell 1, the capacitor 2, and the secondary battery 6 is used, and in which order they are to be used, to supply electric power to the first electric power supply unit 10.

At this time, when the first switch SW 1 is turned ON, the electric power supply control means 30 turns OFF the third switch SW 3 on the condition that the ignition is OFF, to thereby cut off the supply of the electric power to the PDU 4. This prevents electric power from being supplied to the electric motor 5 side in the OFF state of the ignition, avoiding waste of electric power at the PDU 4 and the like.

In the power source selecting routine shown in the flowchart in FIG. 3, the electric power supply control means 30 firstly detects the SOC of the capacitor 2 according to a routine of detecting the SOC of the capacitor 2 (STEP 10), and determines whether the SOC of the capacitor 2 is greater than 25% (corresponding to the "discharge threshold value" of the present invention) (STEP 20). In the SOC detection routine of the capacitor 2 in STEP 10, the SOC of the capacitor 2 is calculated from the output voltage and output current of the capacitor 2, based on the table which defines the relationship between the output voltage and output current of the capacitor 2 and the SOC of the capacitor 2. This table allows the SOC of the capacitor 2 to be calculated based only on its output voltage in the case where the output current of the capacitor 2 is 0.

If the SOC of the capacitor 2 is greater than 25% (YES in STEP 20), electric power supply from the capacitor 2 to the first electric power supply unit 10 is started (STEP 30), and the process returns to STEP 10.

Specifically, in FIG. 2, the SOC of the capacitor 2 is about 85% at time t1 (YES in STEP 20). Thus, the electric power supply control means 30 stops operations of the voltage boosting means 3 and the voltage conversion means 7, and causes the DC/AC converter 11 to operate to convert the DC voltage on the first electric power supply line L1 directly connected to the capacitor 2 to a commercial AC voltage, to be supplied to the first electric power supply unit 10 (STEP 30). As the electric power is supplied from the capacitor 2 to the first electric power supply unit 10, the SOC of the capacitor 2 gradually decreases over time (t1<t<t2).

In FIG. 3, if the SOC of the capacitor 2 is not greater than 25% (NO in STEP 20), the SOC of the secondary battery 6 is detected according to a routine of detecting the SOC of the secondary battery 6 (STEP 40), and it is determined whether the SOC of the secondary battery 6 is not less than 30% (STEP 50).

Here, the threshold value for determination of the SOC level of the secondary battery 6 is set to 30% taking into consideration the time difference from the time when the fuel cell 1 is activated to the time when it can output a predetermined rated output, as will be described later, so that the power supply from the fuel cell 1 can be started before the SOC of the secondary battery 6 decreases to 25% (corresponding to the "discharge threshold value" of the present invention). Further, in the SOC detection routine of the secondary battery 6 in STEP 40, the SOC is calculated from the output voltage and output current of the secondary battery 6, based on the table defining the relationship between them and the SOC of the secondary battery 6. The table enables calculation of the SOC of the secondary battery 6 based only on its output voltage when the output current of the secondary battery 6 is 0.

If the SOC of the secondary battery 6 is not less than 30% (YES in STEP 50), electric power supply from the secondary battery 6 to the first electric power supply unit 10 is started (STEP 60), and the process returns to STEP 10.

Specifically, in FIG. 2, with the SOC of the capacitor 2 gradually decreasing over time (t1<t<t2), when it reaches 25% at time t2 (STEP 20), the SOC of the secondary battery 6 is detected (STEP 40). In this case, the SOC of the secondary battery 6 is about 50% at time t2 (YES in STEP 50), and thus, the electric power supply control means 30 causes the voltage boosting means 3 and the voltage conversion means 7 to operate to supply electric power from the secondary battery 6 to the first electric power supply unit 10 (STEP 60).

More specifically, the DC voltage (of about 290 V to about 350 V) on the second electric power supply line L2 directly connected to the secondary battery 6 is boosted to the voltage (of about 370 V to about 570 V) on the third electric power supply line L3 via the voltage conversion means 7, and then, the voltage boosting means 3 is used as the voltage step-down means (step-down converter) from the electric motor 5 side, to supply electric power from the secondary battery 6 to the first electric power supply line L1.

As the electric power is supplied from the secondary battery 6 to the first electric power supply unit 10, the SOC of the secondary battery 6 gradually decreases over time (t2<t<t3).

In FIG. 3, if the SOC of the secondary battery 6 is less than 30% (NO in STEP 50), a routine of activating the fuel cell 1 (see FIG. 4), which will be described later, is performed to generate electric power by the fuel cell 1, to supply it from the fuel cell 1 to the first electric power supply unit 10.

Specifically, in FIG. 2, with the SOC of the secondary battery 6 decreasing over time (t2<t<t3), when it becomes less than 30% at time t3 (STEP 50), the fuel cell 1 starts generation of the electric power. Then, when the output of the fuel cell 1 reaches a predetermined rated output (e.g., about 80% of the maximum output) at time t4, the electric power supply control means 30 causes the fuel cell 1 to supply electric power to the first electric power supply unit 10, and also causes the voltage boosting means 3 and the voltage conversion means 7 to operate to supply the electric power to the capacitor 2 and the secondary battery 6 for charging them.

More specifically, when the electric power is supplied from the fuel cell 1 to the first electric power supply line L1 at time t4, the electric power is supplied from the first electric power supply line L1 to the first electric power supply unit 10, and is also supplied from the first electric power supply line L1 to the capacitor 2 for charging the capacitor 2. Further, the electric power supplied to the first electric power supply line L1 is supplied to the secondary battery 6 via the voltage boosting means 3 and the voltage conversion means 7 for charging the secondary battery 6.

As the SOC of the capacitor 2 and that of the secondary battery 6 increase (t4<t<t6), when they both reach a predetermined level at time t6, electric power generation by the fuel cell 1 is stopped, and the electric power is supplied to the first electric power supply unit 10 again in the order of the capacitor 2, the secondary battery 6, and the fuel cell 1 (with the process returning to STEP 10).

The overall operation of the fuel cell power supply device of the present embodiment has been described above. It is noted that the electric power supply control means 30 may carry out the power source selecting routine shown in FIG. 3 repeatedly, to switch the supply of electric power to the first electric power supply unit 10 from the fuel cell 1, the capacitor 2, and the secondary battery 6, in accordance with the changes in their states.

The routine of activating the fuel cell 1 in STEP 70 will now be described in detail with reference to the flowchart in FIG. 4.

Firstly, the electric power supply control means 30 refers to the remaining amount in a fuel tank (not shown) storing the fuel of the fuel cell 1, which is hydrogen, to determine whether the hydrogen level is not lower than a predetermined value (STEP 71). Here, the predetermined value corresponds to the hydrogen amount large enough to drive the fuel cell 1 for a prescribed period of time.

If the hydrogen level is not lower than the predetermined value (YES in STEP 71), the electric power is supplied to the auxiliary machine 8 via the PDU 9 to start operation of the auxiliary machine, so that the supply of the reaction gas to the fuel cell 1 is started to activate the fuel cell 1 (STEP 72). When the output of the fuel cell 1 reaches a predetermined rated output, the electric power supply control means 30 starts supply of the electric power from the fuel cell 1 to the first electric power supply line L1, as described above (STEP 73). In this manner, the first electric power supply unit 10 is supplied with the electric power from the fuel cell 1.

On the other hand, if the hydrogen level is lower than the predetermined value (NO in STEP 71), a warning indicating shortage of the hydrogen is displayed on the display unit 31 (STEP 74), and the series of processing is terminated.

When the electric power is supplied from the fuel cell 1 to the first electric power supply line L1 (STEP 73), the electric power supply control means 30 determines whether the SOC of the capacitor 2 and that of the secondary battery 6 have increased, based on the output voltages therefrom (STEP 75).

If the SOC of the capacitor 2 and that of the secondary battery 6 have both increased (YES in STEP 75), it is determined whether the SOC of the capacitor 2 and that of the secondary battery 6 have reached an upper limit level (STEP 76). If they have both reached the upper limit level (YES in STEP 76), generation of electric power by the fuel cell 1 is stopped (STEP 77), and the series of processing regarding the routine of activating the fuel cell 1 in STEP 70 is terminated to return to STEP 10 (see FIG. 3).

On the other hand, if the SOC of either the capacitor 2 or the secondary battery 6 has not increased (NO in STEP 75), there is a possibility that either the capacitor 2 or the secondary battery 6 is supplying electric power to the first electric power supply unit 10 as well, with the capacitor 2 and/or the secondary battery 6 not charged from the fuel cell 1. Thus, in such a case, the amount of electric power generated by the fuel cell 1 is increased (STEP 78) to raise the output voltage of the fuel cell 1. Subsequently, it is determined whether the amount of electric power generated by the fuel cell 1 thus increased has reached an output upper limit of the fuel cell 1 (STEP 79).

If it has not yet reached the output upper limit of the fuel cell 1 (NO in STEP 79), the process returns to STEP 75, where it is determined whether the SOC of the capacitor 2 and that of the secondary battery 6 have increased, based on their output voltages. On the other hand, if the power generation amount by the fuel cell 1 has reached its output upper limit (YES in STEP 79), with the output upper limit being maintained (STEP 80), a message to the effect that the output of the fuel cell 1 is at the output upper limit level is displayed on the display unit 31 (STEP 81), and the process returns to step 75 to determine whether the SOC of the capacitor 2 and that of the secondary battery 6 have increased, based on their output voltages.

If it is determined in STEP 76 that the SOC of the capacitor 2 and that of the secondary battery 6 have not reached the upper limit level (NO in STEP 76), the process returns to STEP 75, where it is determined whether the SOC of the capacitor 2 and that of the secondary battery 6 have continuously increased, based on their output voltages.

The routine of activating the fuel cell 1 in STEP 70 have been explained in detail above.

According to the fuel cell power supply device with the above configuration, electric power can be supplied stably to the first electric power supply unit 10 in the form of commercial AC voltage of 100 V, taking into consideration the SOC of the capacitor 2, the SOC of the secondary battery 6, and the output of the fuel cell 1. It is also possible to readily implement the configuration where the electric power is supplied from the fuel cell 1 to the capacitor 2 and the secondary battery 6 for charging them.

While the electric power is supplied to the first electric power supply unit 10 firstly from the capacitor 2 and secondly from the secondary battery 6 in the present embodiment, the order is not limited thereto. The electric power may be supplied to the first electric power supply unit 10 firstly from the secondary battery 6 and secondly from the capacitor 2, or may be supplied to the first electric power supply unit 10 only from either the capacitor 2 or the secondary battery 6. For example, in the case where the charge capacity of the capacitor 2 is greater than that of the secondary battery 6, the electric power may be supplied firstly from the secondary battery 6 and secondly from the capacitor 2, or may be supplied only from the capacitor 2, to ensure stable supply of electric power from the capacitor 2 to the first electric power supply unit 10 over a long period of time.

Further, while the voltage boosting means 3 and the voltage conversion means 7 are both operated to supply the electric power from the secondary battery 6 to the first electric power supply unit 10 in the present embodiment, the configuration is not limited thereto. One of the voltage boosting means 3 and the voltage conversion means 7 may be fixed (short-circuited), to control the electric power supply from the secondary battery 6 to the first electric power supply unit 10 based only on the operating level of the other one of them.

Furthermore, while the first electric power supply unit 10 is provided between the capacitor 2 and the voltage boosting means 3 in the present embodiment, it may be provided between the voltage boosting means 3 and the PDU 4 (SW 3). This enables supply of the electric power to the first electric power supply unit 10 with the high voltage on the third electric power supply line L3, ensuring stable supply of the electric power even in the case of using an electric appliance requiring large electric power (e.g., a microwave oven or dryer) or charging another electric vehicle.

Further, while the second electric power supply unit 20 is supplied with small electric power preferentially from the secondary battery 6 in the present embodiment, the configuration is not limited thereto. It may be supplied with the electric power also from the fuel cell 1 and the capacitor 2 via the voltage boosting means 3 and the voltage conversion means 7. Further, while the first electric power supply unit 10 is provided on the first electric power supply line L1, the second electric power supply unit 20 may be provided on the third electric power supply line L3. This configuration allows the second electric power supply unit 20 to supply electric power with high voltage equal to or greater than that of the first electric power supply unit 10.

Furthermore, in generation of electric power by the fuel cell 1, while the amount of electric power generated by the fuel cell 1 is increased (STEP 78) if the SOC of the capacitor 2 and that of the secondary battery 6 do not increase (NO in STEP 75) in the present embodiment, the configuration is not limited thereto. In the case where the SOC of the secondary battery 6 does not increase, the operation of one or both of the voltage boosting means 3 and the voltage conversion means 7 may be controlled, which can suppress an increase in amount of electric power generated by the fuel cell 1.

While the configuration including the capacitor 2 and the secondary battery 6 in addition to the fuel cell 1 has been described in the present embodiment, not limited thereto, the secondary battery 6 may be omitted. In this case, after the electric power supply from the capacitor 2 is started, when the SOC level of the capacitor 2 has decreased to 35% for example, the generation of electric power by the fuel cell 1 is started. When the output of the fuel cell 1 reaches a predetermined rated output (e.g., about 80% of the maximum output), the electric power supply control means 30 causes the fuel cell 1 to supply electric power to the first electric power supply unit 10. Here, the threshold value for determination of the SOC level of the capacitor 2 is set to 35% taking into consideration the time difference from the time when the fuel cell 1 is activated to the time when its output reaches the predetermined rated output, to enable start of electric power supply from the fuel cell 1 before the SOC of the capacitor 2 decreases to 25% (which corresponds to the "discharge threshold value" of the present invention). Once the supply of electric power from the fuel cell 1 is started, the state of power generation by the fuel cell 1 can also be grasped from the SOC level of the capacitor 2.

What is claimed is:

1. A fuel cell power supply device, comprising: a fuel cell; a capacitor connected in parallel to the fuel cell; a voltage boosting means having an input unit connected in parallel to the fuel cell and the capacitor and having an output unit connected to a load, and for boosting output voltages of the fuel cell and the capacitor to supply electric power by the boosted voltages to the load; a first electric power supply unit connected in parallel to the fuel cell and the capacitor and capable of externally supplying electric power; an electric power supply control means for controlling supply of electric power from the fuel cell and the capacitor to the first electric power supply unit, based on an output of the fuel cell and a charge level of the capacitor, in a range where the charge level of the capacitor is not lower than a discharge threshold value of the capacitor, and a secondary battery connected to the output unit of the voltage boosting means via a voltage conversion means.

2. The fuel cell power supply device according to claim 1, wherein the electric power supply control means controls supply of electric power from the fuel cell, the capacitor, and the secondary battery to the first electric power supply unit, based on an output of the fuel cell, a charge level of the capacitor, and a charge level of the secondary battery, in a range where the charge level of the capacitor is not lower than a discharge threshold value of the capacitor and where the charge level of the secondary battery is not lower than a discharge threshold value of the secondary battery.

3. The fuel cell power supply device according to claim 2, wherein the electric power supply control means controls such that the supply of the electric power to the first electric power supply unit is carried out from the capacitor or from the secondary battery prior to operation of the fuel cell.

4. The fuel cell power supply device according to claim 3, wherein
   the electric power supply control means carries out supply of the electric power to the first electric power supply unit firstly from the capacitor, secondly from the secondary battery, and thirdly from the fuel cell,
   in the case where the charge level of the capacitor reaches the discharge threshold value, the electric power supply control means starts supply of the electric power to the first electric power supply unit from the secondary battery in place of the capacitor, and in the case where the charge level of the secondary battery reaches a predetermined value that is set greater than the discharge threshold value, the electric power supply control means starts operation of the fuel cell, and in the case where the fuel cell is ready to output a predetermined output, the electric power supply control means starts supply of the electric power to the first electric power supply unit from the fuel cell in place of the secondary battery.

5. The fuel cell power supply device according to claim 2, wherein the first electric power supply unit is provided between the capacitor and the voltage boosting means.

6. The fuel cell power supply device according to claim 5, wherein the electric power supply control means controls operation of one or both of the voltage boosting means and the voltage conversion means to control supply of the electric power from the secondary battery to the first electric power supply unit and supply of the electric power from the fuel cell to the secondary battery.

7. The fuel cell power supply device according to claim 5, comprising a second electric power supply unit connected in parallel to the voltage conversion means and the secondary battery and capable of externally supplying electric power.

8. The fuel cell power supply device according to claim 7, wherein the second electric power supply unit is provided between the voltage conversion means and the secondary battery.

9. The fuel cell power supply device according to claim 5, mounted on a vehicle, wherein the load is an electric motor serving as a motive power source of the vehicle.

10. The fuel cell power supply device according to claim 1, wherein the first electric power supply unit includes a first switch turning on/off external supply of the electric power.

11. The fuel cell power supply device according to claim 2, comprising a display means for displaying the charge levels of the capacitor and the secondary battery.

* * * * *